United States Patent
Miller et al.

(10) Patent No.: US 12,378,074 B2
(45) Date of Patent: Aug. 5, 2025

(54) TRAY EXCHANGE AND DISPOSITIONING SYSTEMS, METHODS, AND APPARATUSES

(71) Applicant: DWFritz Automation, LLC, Wilsonville, OR (US)

(72) Inventors: Adam Quinn Miller, Wilsonville, OR (US); Thomas Wayne Tipton, Wilsonville, OR (US); Robert D. Batten, Wilsonville, OR (US); Mark Laurin Baker, Wilsonville, OR (US); Roy Daniel Garoutte, Wilsonville, OR (US)

(73) Assignee: DWFritz Automation, LLC, Wilsonville, OR (US)

( * ) Notice: Subject to any disclaimer, the term of this patent is extended or adjusted under 35 U.S.C. 154(b) by 558 days.

(21) Appl. No.: 17/753,466

(22) PCT Filed: Sep. 3, 2020

(86) PCT No.: PCT/US2020/049265
§ 371 (c)(1),
(2) Date: Mar. 3, 2022

(87) PCT Pub. No.: WO2021/046264
PCT Pub. Date: Mar. 11, 2021

(65) Prior Publication Data
US 2022/0315334 A1  Oct. 6, 2022

Related U.S. Application Data

(60) Provisional application No. 62/895,345, filed on Sep. 3, 2019.

(51) Int. Cl.
*B65G 1/06* (2006.01)
*B65G 1/137* (2006.01)
*B65G 61/00* (2006.01)

(52) U.S. Cl.
CPC ............. *B65G 1/06* (2013.01); *B65G 1/1371* (2013.01); *B65G 61/00* (2013.01); *B65G 2201/0258* (2013.01)

(58) Field of Classification Search
CPC ........ B65G 1/06; B65G 1/1371; B65G 61/00; B65G 2201/0258
See application file for complete search history.

(56) References Cited

U.S. PATENT DOCUMENTS 6,866,470 B2    3/2005  Peterson et al.
2004/0031768 A1*  2/2004  Kakita ............. H01L 21/67333
                                                    211/41.1

(Continued)

FOREIGN PATENT DOCUMENTS

JP    2007197214 A    8/2007
KR  10-20140136076 A  11/2014

(Continued)

OTHER PUBLICATIONS

International Search Report and Written Opinion for International PCT Application No. PCT/US2020/049265, mailed Feb. 24, 2021, 9 pages.

*Primary Examiner* — Kyle O Logan
(74) *Attorney, Agent, or Firm* — Vedder Price P.C.

(57) ABSTRACT

A tray handler for transporting a tray into or out from a selectable position within a tray stack stowed in the tray handler has an unload station to stow a tray during a sort procedure, a tray elevator configured to vertically transport the tray stack to the selectable position such that the tray is positioned to be horizontally received from or by the unload station, and a separator above the tray elevator and coupled to the unload station, the separator configured to vertically (Continued)

split the tray stack for opening the selectable position and horizontally transporting the tray into or out from the unload station.

16 Claims, 13 Drawing Sheets

(56) References Cited

U.S. PATENT DOCUMENTS

| | | | | |
|---|---|---|---|---|
| 2005/0180844 A1* | 8/2005 | Uekert | ................... | G01R 31/01 |
| | | | | 414/788.1 |
| 2008/0038097 A1* | 2/2008 | Kim | ........................ | B65B 13/02 |
| | | | | 414/217.1 |
| 2013/0118124 A1* | 5/2013 | Cheah | ................... | B65D 85/00 |
| | | | | 53/410 |
| 2015/0340253 A1* | 11/2015 | Oosterlaken | ...... | H01L 21/67736 |
| | | | | 414/172 |

FOREIGN PATENT DOCUMENTS

| | | |
|---|---|---|
| KR | 10-20190095777 A | 8/2019 |
| WO | 2011151694 A1 | 12/2011 |

* cited by examiner

TRAY EXCHANGE AND DISPOSITIONING SYSTEMS, METHODS, AND APPARATUSES

RELATED APPLICATION

This application is a National Stage of International Application No. PCT/US2020/049265, filed Sep. 3, 2020, which claims priority benefit of U.S. Provisional Patent Application No. 62/895,345, filed Sep. 3, 2019, all of which are hereby incorporated by reference in their entireties.

TECHNICAL FIELD

The present disclosure relates to matrix tray feeder, stacker, and sorter systems. More particularly, the present disclosure relates to tray handlers configured to sort an internal stack of trays to facilitate automated loading and unloading of desired components in trays.

BACKGROUND INFORMATION

Integrated circuits and other components are sometimes held in custom or JEDEC standard matrix trays (or simply trays). A tray is used to carry components (typically integrated circuits) during component-assembly operations, test, measurement, transport, and storage. JEDEC trays and other similar types of trays are stackable, as described in U.S. Pat. No. 6,866,470 of Peterson et al.

Some attempts have been made to provide access to trays stowed in a stack. For example, International Application Publication No. WO 2011/151694 of Kammermann et al. describes a random-access carrier member system for feeding carrier members. The embodiments described in this publication, however, necessitate a magazine or cassette of trays, in which each tray has the same thickness.

In some applications having large volumes of parts, different part types, or parts to be binned into certain categories (e.g., failed versus good parts), the number of tray feeders can cause the applications to be economically unfeasible. In such cases, binning and sorting are performed manually. Manual binning and sorting, however, is labor intensive, error prone, and slow.

SUMMARY OF THE DISCLOSURE

Described herein are tray feeder, stacker, and sorter systems, methods, and apparatuses. In some embodiments, a tray handler can sort trays (i.e., a tray being re-insertable into any tray position within a stack). By handling both stacking and sorting, the disclosed tray handler can sort the stack of trays without interrupting production. Additionally, because sorting may increase processing speed, a tray handling and disposition system may employ fewer tray handlers.

The disclosed tray handlers provide efficient and safe handling, transport, and storage of integrated circuits and other components stowed in trays. The ability to sort trays, including trays of different thicknesses, without a magazine or other type of cassette drastically reduces the number of stackers and feeders for a given application.

In addition to reducing the number of stackers the sorting significantly reduces cycle time. The stack can be sorted on demand so that a desired subset of trays in a stack can be delivered to optimize workflow.

Additional aspects and advantages will be apparent from the following detailed description of embodiments, which proceeds with reference to the accompanying drawings.

BRIEF DESCRIPTION OF THE DRAWINGS

FIGS. 8, 9, 10, and 11 are fragmentary isometric views showing in greater detail actuation positions of a latch of the separator, in which FIG. 9 shows a mid position, FIG. 10 shows a retracted position, and FIGS. 8 and 11 show an extended position.

DETAILED DESCRIPTION OF EMBODIMENTS

Figure 1:
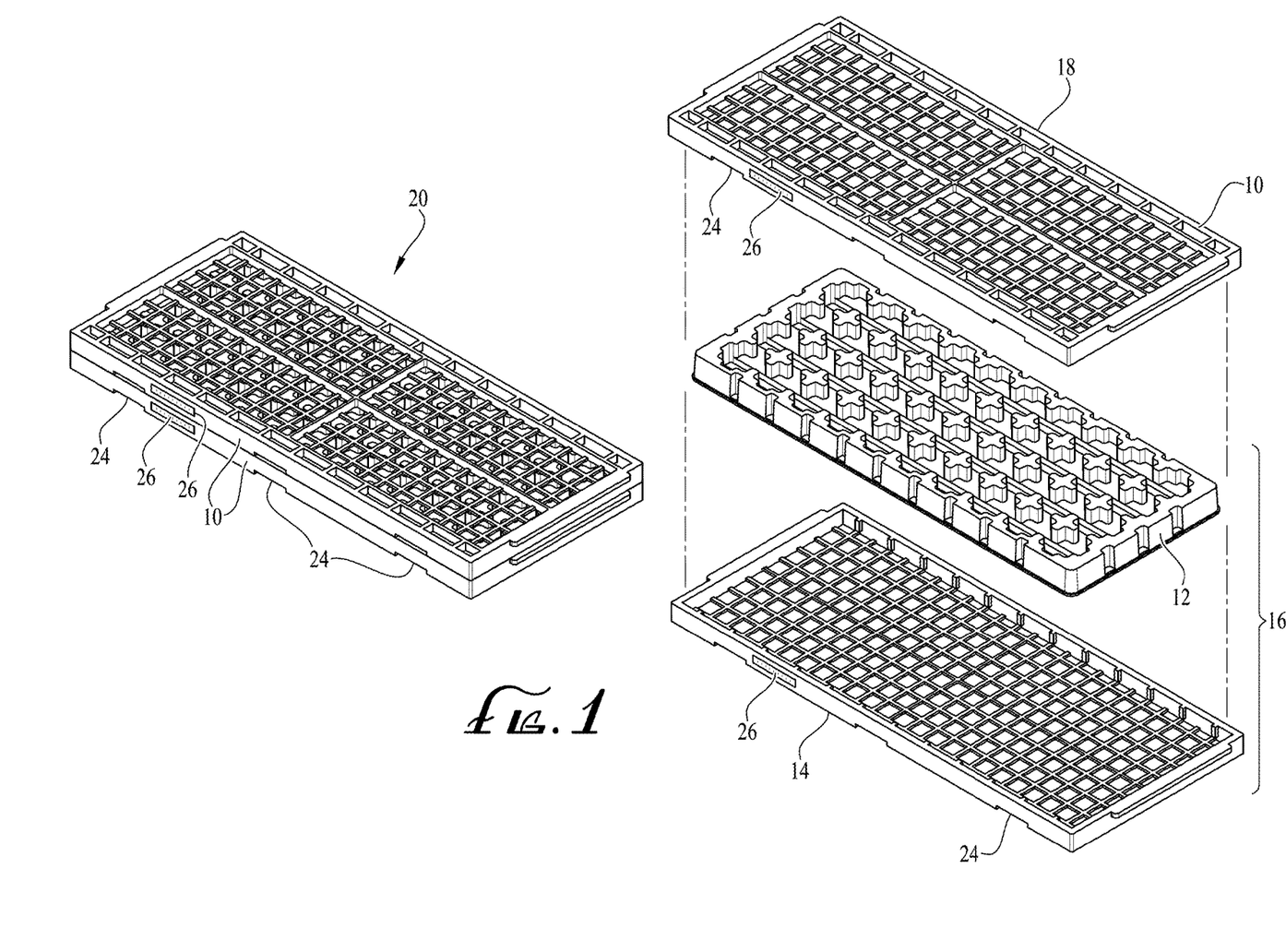
FIG. 1 is an isometric view of two tray frames, showing them stacked and separated to reveal an insert between two frames.

FIG. 1 shows tray frames 10 including an optional insert 12 that clips into position atop a lower frame 14 to form a tray 16. Because inserts are optional, tray frames 10 are also simply called trays. Insert 12 of tray 16 may be covered by an upper frame 18 (and additional trays not shown) to form a tray stack 20. In one embodiment, inserts are vacuum formed and clip into custom or standard JEDEC tray frames. Vacuum tray inserts may have various thicknesses. In some embodiments, a single tray stack may include vacuum tray inserts with multiple thicknesses (heights). In other embodiments, tray frames themselves may have different heights in a stack.

A bottom surface region of each tray frame 10 includes tray latch pockets 24, which are recessed into the bottom of tray and designed so a tray cannot slide off latches described later in more detail. Also described later is a unique optical code (e.g., barcode) 26, located on a sidewall of each tray frame 10, for an in situ optical code reader to track and identify a tray in a processing system.

Figure 2:
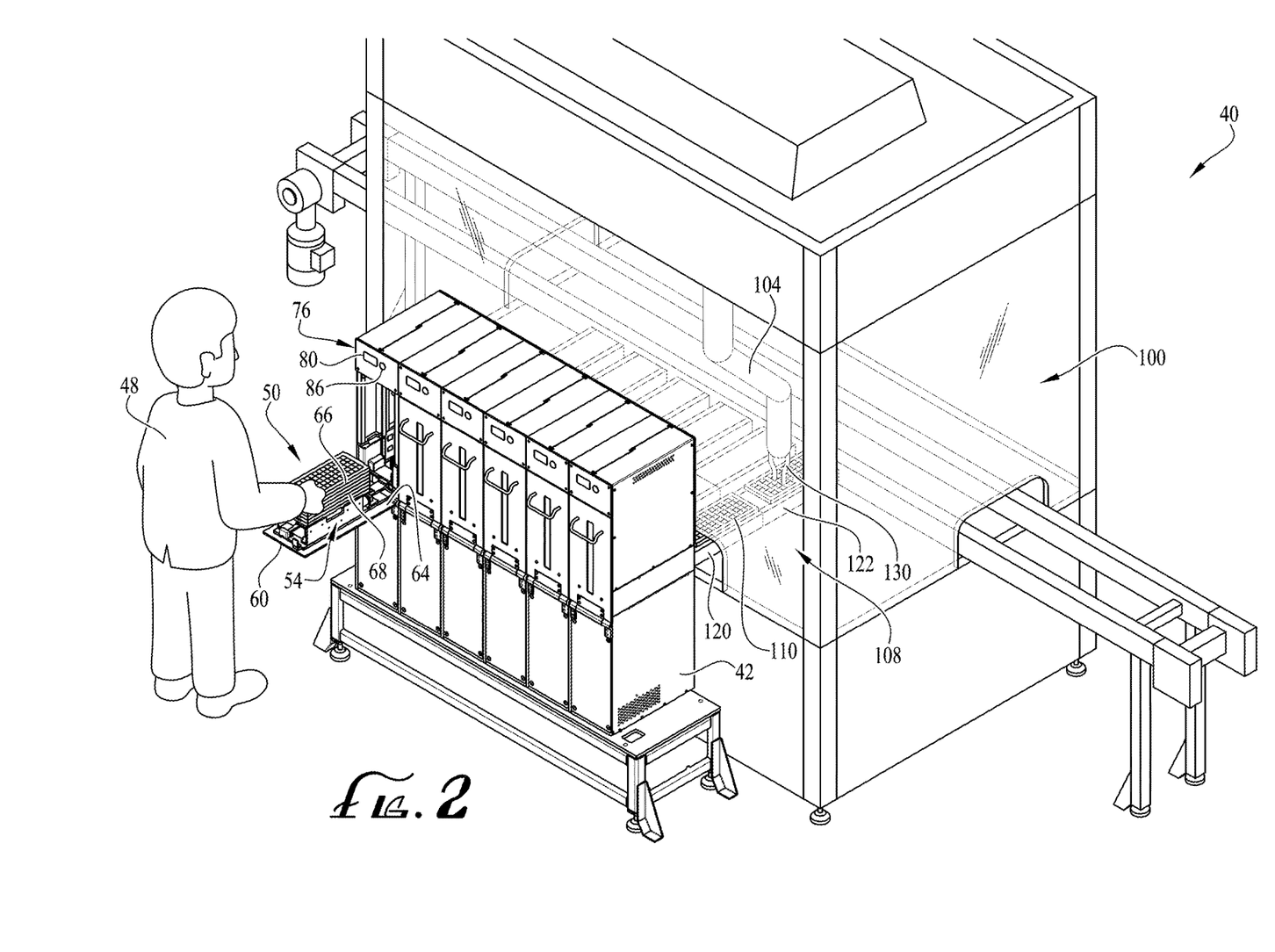
FIG. 2 is an isometric view of a tray exchange and dispositioning system including six tray handlers arranged side by side on a mounting platform.

FIG. 2 shows a tray exchange and dispositioning system 40, according to one embodiment. Tray exchange and dispositioning system 40 includes multiple automated tray handlers 42 (e.g., automated tray handler 42a-42f), also called tray feeders or stackers. Because each of one of stackers 42 is identical, reference numbers identifying features of one stacker 42a-42f are common to the other stackers 42. Skilled persons will appreciate, however, that in some applications the stackers need not be identical (e.g., some stackers may hold a greater number of trays).

Stackers 42 may bin, stack, and sort trays 16. For example, an operator 48 (e.g., a technician or an automated guided vehicle (AGV)) loads up to 15 barcoded JEDEC trays 16 in tray stack 50 onto a tray-stack loading station 54 of one of six stackers 42. Tray-stack loading station 54 includes a hinged loading door 60 that swings down to reveal a horizontal loading surface 64 at an ergonomic, SEMI S8-1116 compliant load height. Door 60 is configured for front loading such that adjacent stackers need not maintain any side clearance, which allows for tightly pitched stacker spacing. Note, that the quantity of 15 trays is based on the tray thickness and height of stacker, both of which may vary in different embodiments.

Stackers 42 are configured to split tray stack 50, support random insertion (in addition to random access), and reorder individual trays 16 in tray stack 50 when sorting them into a sorted stack. As explained in the following example deployment scenario, sorting offers greater capacity, shorter takt time, and binning flexibility. Thus, because it can stack and sort trays, tray exchange and dispositioning system 40 offers an economical and competitive advantage for applications utilizing different parts in trays.

In one example, tray stack 50 initially contains untested parts, with four different types of trays (A-D types) corresponding to four different types of untested parts. For example, a tray 66 contains a first type of integrated circuit whereas a tray 68 contains a second type of integrated circuit that is different from the first type. Furthermore, each type of workpiece has different failure modes when subjected to test and measurement equipment (not shown) that receive each tray for testing parts carried therein. Accordingly, in the present example, there are 32 different resulting bins of tested parts in tray exchange and dispositioning system 40 (i.e., a bin corresponding to trays holding common parts having the same test results).

In a conventional system, each bin would be assigned to one of 32 different stackers, or different nesting stations would be positioned along the test line to collect and partly organize the bins until a stacker is available to stow them. Having 32 different stackers or several dedicated nesting stations requires floorspace and a relatively large factory footprint that is not feasible or economical in some factories. Alternatively, each conventional stacker might hold multiple bins (e.g., a stack of trays in which some trays contain failed parts and other trays contain good parts), but operator 48 would then need to identify and hand sort each tray. Hand sorting is slow and error prone, particularly since trays 16 have only an optical code by which to identify the parts in the tray. Moreover, operator 48 might have to check multiple stackers to finally find a tray needed for downstream production tasks.

In contrast, tray exchange and dispositioning system 40 includes the ability of a stacker to sort, which allows for faster processing of parts in trays. For instance, when operator 48 wants to load or collect bad parts, a stacker sorts and prepares at the top of its internal stack a desired subset of trays for operator 48. In other words, the desired trays can be randomly accessed and sorted in response to a request from operator 48 or another signal from production software.

In one embodiment, a graphical user interface 76 allows operator 48 to observe, among other things, which tray types are present in stacker 42. Operator 48 can then select any combination of trays to be delivered in a sorted stack (e.g., two "A" trays, three "B" trays, one "C" tray, and so forth). User interface 76 includes an OLED display screen 80 and one or more buttons 86 to move an internal tray stack 90 (FIG. 3) upward and downward so that a tray or desired stack indicated by OLED display screen 80 as being located at a tray separator 94 (see, e.g., FIGS. 3, 5, and 6) may be ejected from or inserted into internal tray stack 90. The desired stack is delivered back onto tray-stack loading station 54, and operator 48 is prevented from inadvertently grabbing additional trays stowed in stacker 42 that are not intended for operator 48. In other embodiments, a desired tray may be ejected onto a conveyor system explained below.

FIG. 2 also shows an example of a tray-processing system 100 including a robotic arm 104 (or precision gantry) and other processing equipment (not shown) such as test and measurement equipment. In the present example, each stacker 42 supplies trays 16 with components for assembly, or receives disassembled and graded components, allowing for simultaneous processing of both incoming and outgoing components. As explained previously, tray stacks within each stacker can be comprised of a mixture of trays that contain either part types or graded components.

Each stacker 42 includes a multiple position conveyor system 108 capable of adjusting the horizontal position of an ejected tray 110 to multiple positions, and conveyor system 108 can transition tray 110 between a first position and a second position. The furthest (extended) position of tray 110 on conveyor system 108 is called the nest station, and the inside (retracted) position is called the unload (or sort) station. In the present embodiment, an unload conveyor 120 of each stacker 42 holds tray 110 that, in some examples, is transported out from stacker 42 to be reinserted during a sort procedure. A nest conveyor 122 holds tray 110 when it is ready to be processed. Accordingly, stacker 42 may simultaneously sort trays while tray 110 is in the nest position and independently accessed (worked on) by robotic arm 104.

In some embodiments, nest conveyor 122 is mechanically isolated from unload conveyor 120, which allows for vibration isolation and improved vision integration with system 100 for precision pick and place from nest conveyor 122. Thus, nest conveyor 122 may be mounted on or to the same machine surfaces as those of automation or vision systems. In another embodiment, nest conveyor 122 is rigidly mounted directly to unload conveyor 120.

During an assembly process, custom grippers 130 mounted to robotic arm 104 pick either a main board or a sensor core from one of trays 110 on nest conveyor 122 and place them into custom pallets (not shown). Using vision assistance, a main board is precision placed onto a connector in the pallet. Next, the system accurately inserts an integrated circuit to its corresponding main board pair. The customer-supplied pallet, filled with main boards and integrated circuits, is then transferred to a test station where the paired main and integrated circuit boards are tested and graded.

During a disassembly process, robotic arm 104 removes the paired main board and integrated circuit from the pallet and transfers the integrated circuit or main board assembly to a tray stacker nest. In the nest, the integrated circuits are decoupled from the main board and placed according to their respective grades into the JEDEC trays presented by stacker 42.

Finally, trays 110 are sorted by stacker 42. Operator 48 then removes trays for further processing. Board pairs that have failed the inspection and grading procedure are processed further for additional diagnostics.

Figure 3:
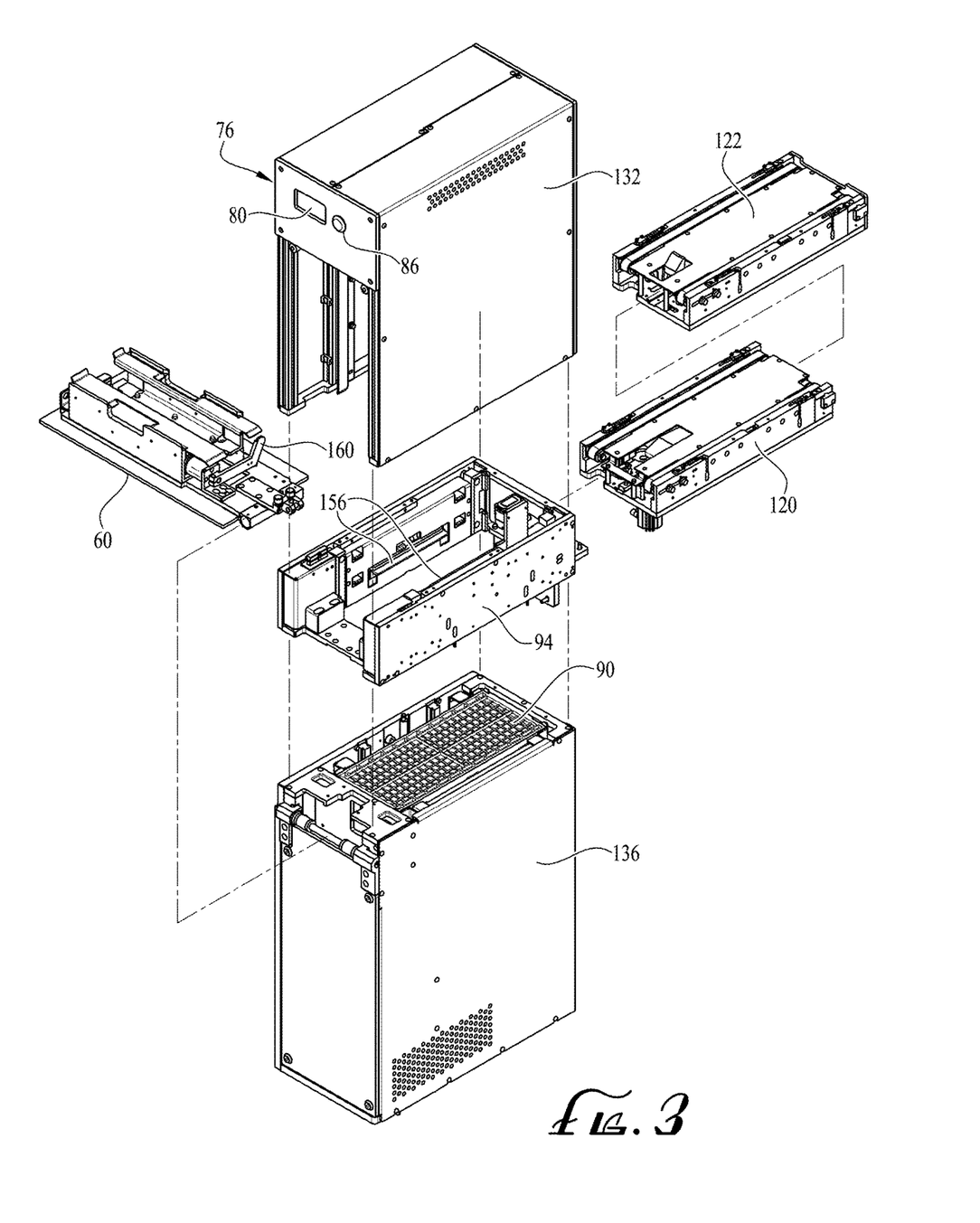
FIG. 3 is a partly exploded isometric view of a tray handler of FIG. 1.
Figure 4:
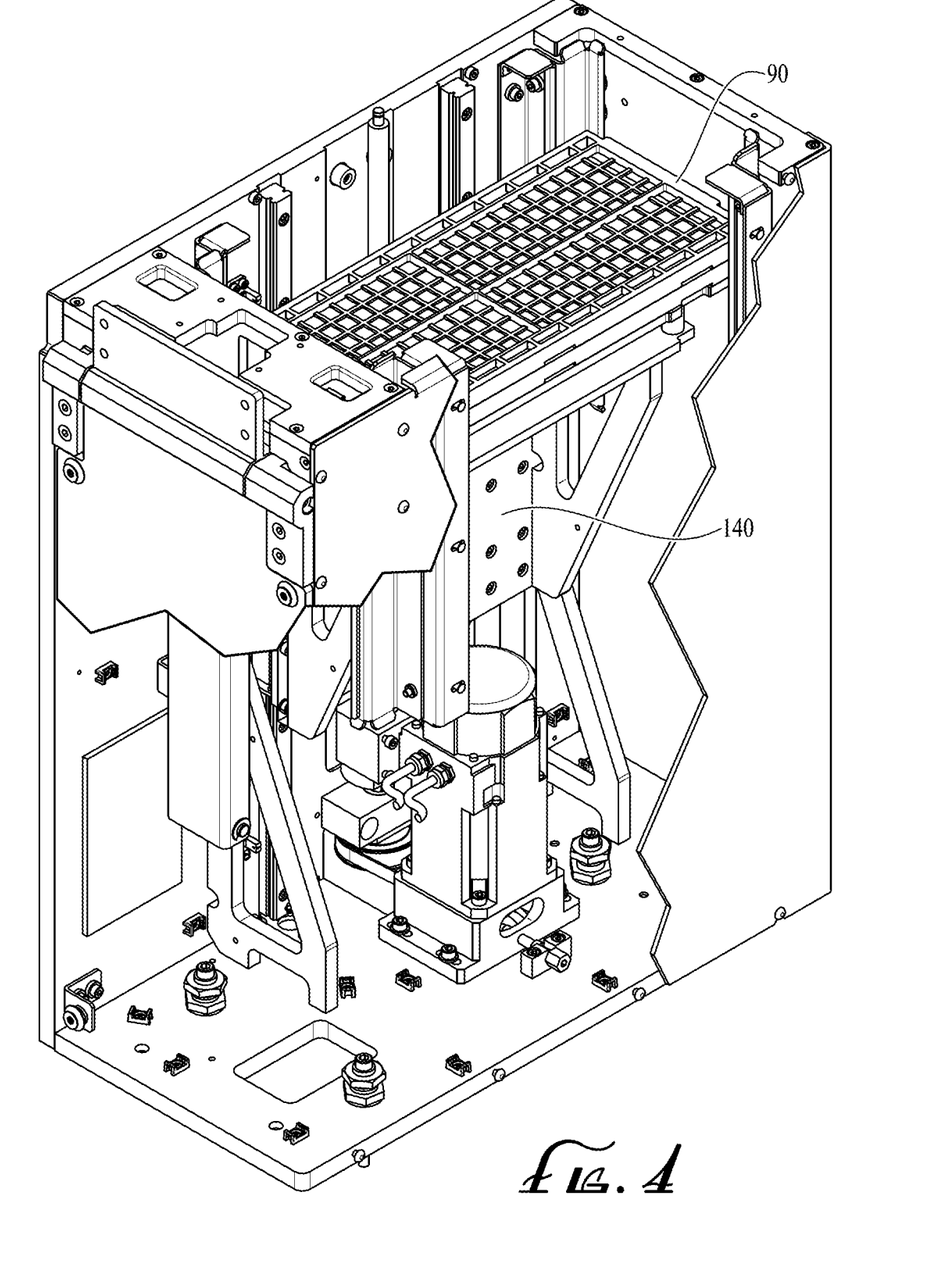
FIG. 4 is a fragmentary isometric view of an elevator shown in FIG. 3.

FIG. 3 shows components of stacker 42 including door 60, separator 94, unload conveyor 120, and nest conveyor 122. An upper enclosure 132 includes graphical user interface 76. A lower enclosure 136 includes an elevator 140 (FIG. 4) to vertically move stack 90. When it is positioned at a selected split position in separator 94, stack 90 is split (as described later) so that a selected tray is partly supported on shelf 156, horizontally aligned with conveyor system 108. The selected tray may then be moved onto unload conveyor 120 by a tray pusher 160 that swings laterally (provided door 60 is sensed as being closed).

Figure 5:
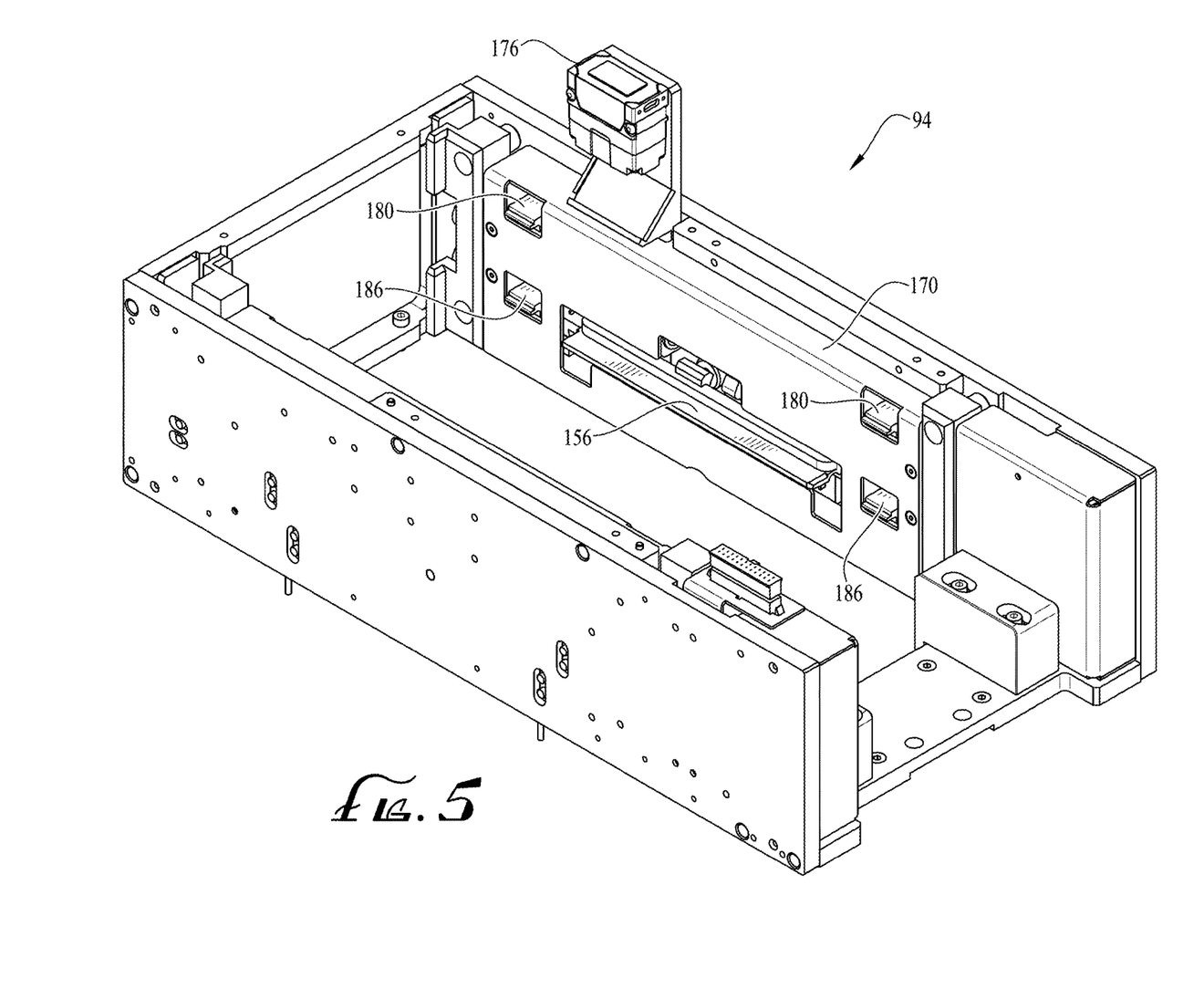
FIGS. 5 and 6 are isometric views of a tray separator shown, respectively, with and without a guard panel and optical code reader.
Figure 6:
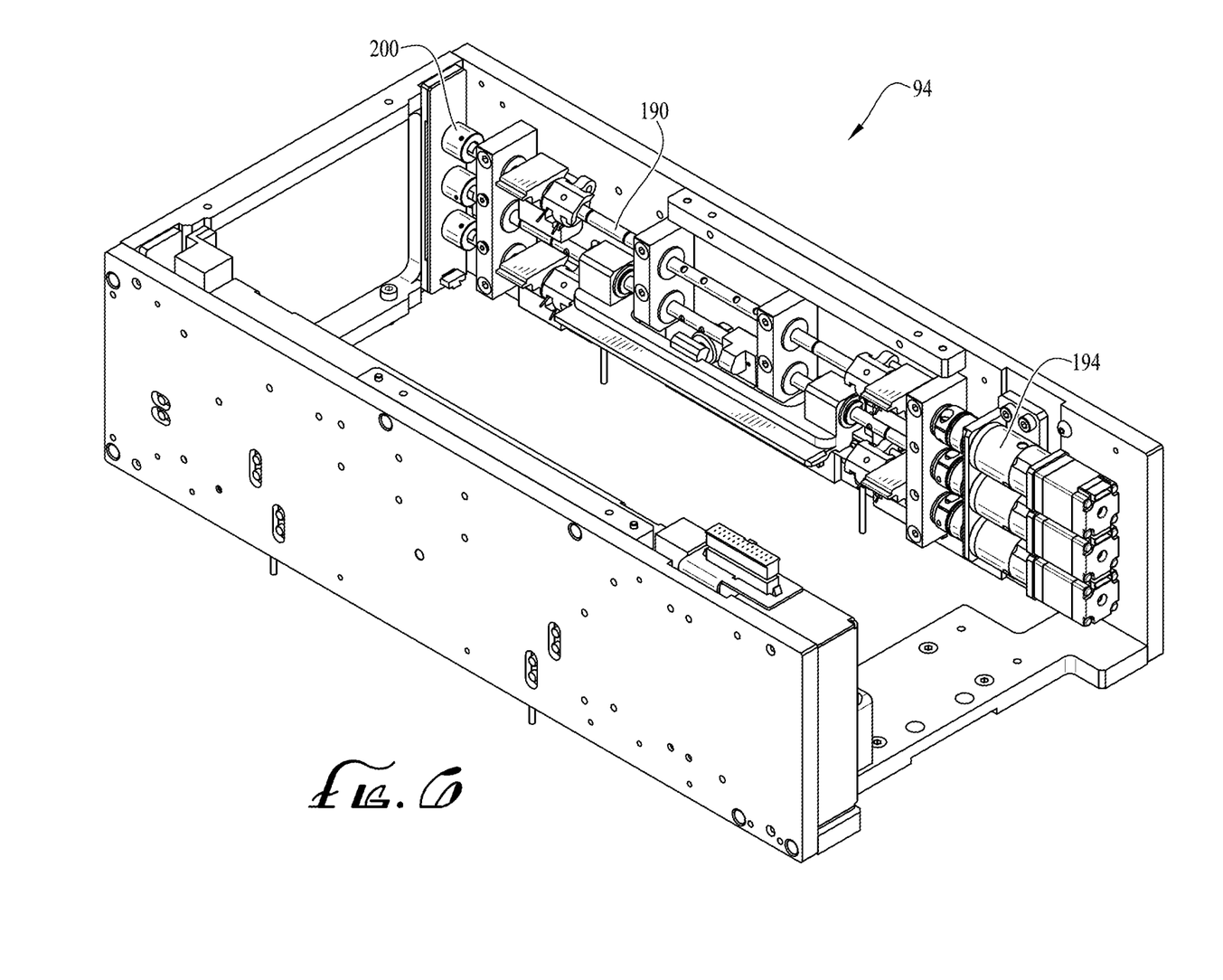

FIGS. 5 and 6 show tray separator 94, respectively, with and without installation of interior guard panel 170 and an in situ optical code reader 176. Interior guard panel 170 includes apertures for upper latches 180, lower latches 186, and shelf 156. Optical code reader 176 includes an angle mirror to direct light from optical codes 26 (FIG. 1) to an imaging device of optical code reader 176. Internal computing device(s) and associated circuitry (not shown) read each optical code 26 passing optical code reader 176, track the corresponding vertical positions of trays in a stack, and query the type of tray at each vertical position. Thus, stacker 42 uses this information to select a split position for delivering a desired tray or sub-stack to operator 48 (e.g., for unloading) or for ejecting a desired tray to unload conveyor 120 (e.g., during a sort procedure or for processing in the nest position).

Figure 7:
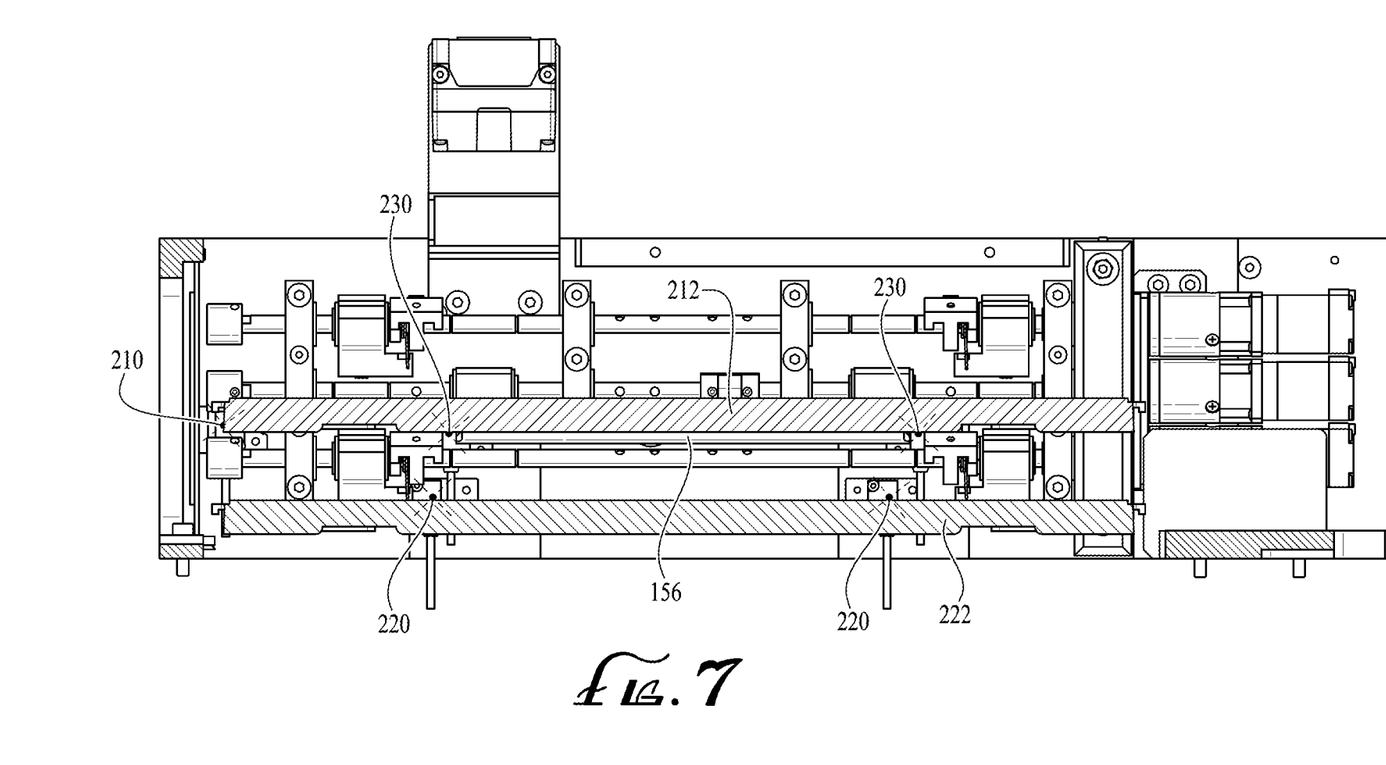
FIG. 7 is a side elevation view of the separator shown in FIG. 6 with the optical code reader.

FIGS. 6 and 7 show an internal view of motor shaft 190, geared electric stepper motors 194, and rotary magnetic encoders 200 for positioning latches 180 and 186 and shelf 156. These components are coordinated with the movement of trays on elevator 140 to facilitate random insertion and access of trays, as explained in more detail later with reference to FIGS. 8-16.

FIG. 7 also shows three optical beams. A front beam 210 verifies a tray 212 is inserted properly preparatory to engaging an elevator move or stacking sequence described below. Front beam 210 also senses whether a leading edge of tray 212 is clear. A lower beam 220 verifies tray 212 is in correct position to actuate shelf 156. It also verifies a tray 222 below is seated correctly and not ajar for restacking. An upper beam 230 verifies tray 222 is seated properly on shelf 156.

Figure 8:
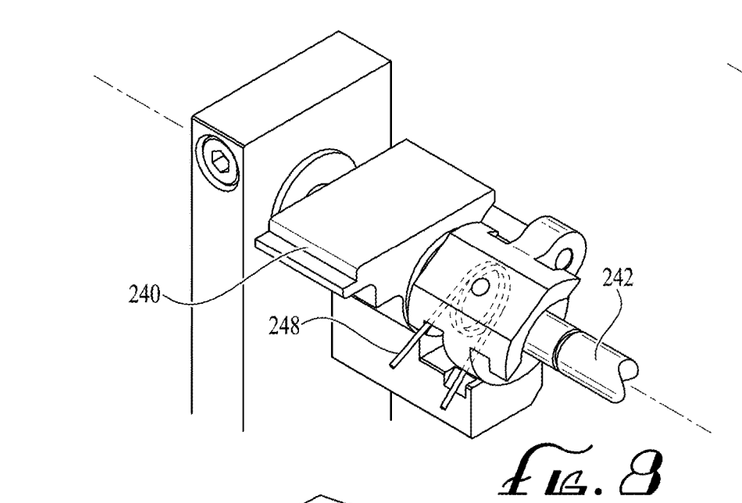

FIGS. 8-11 show how motor shafts 190 are rotated to actuate latches 180 and 186 (generally referred to as tray latches). For instance, as shown in FIG. 8, a tray latch 240 is coupled to a corresponding motor shaft 242 through a torsion spring 248. Torsion spring 248 attempts to push latch 240 down (extended through aperture of guard panel 170) to its extended (horizontal) position. In the extended position, torsion spring 248 is fully compressed.

Figure 9:
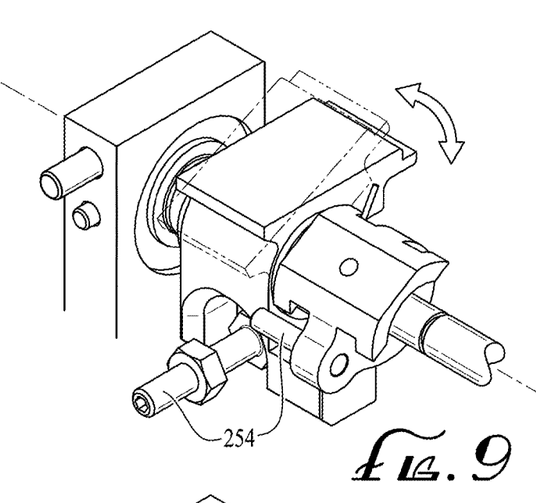
Figure 10:
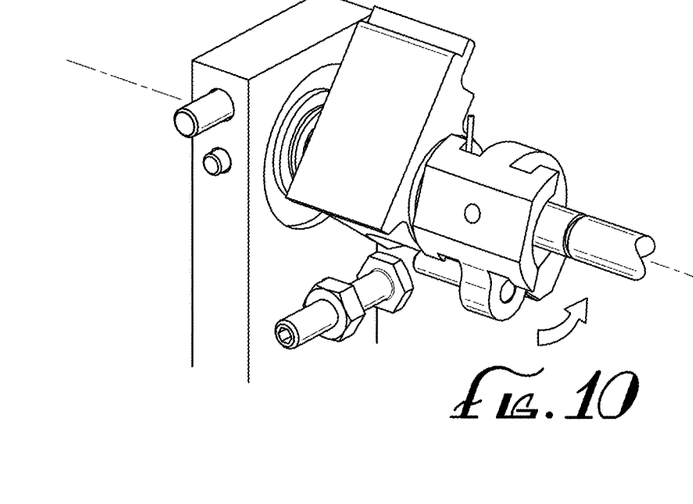
Figure 11:
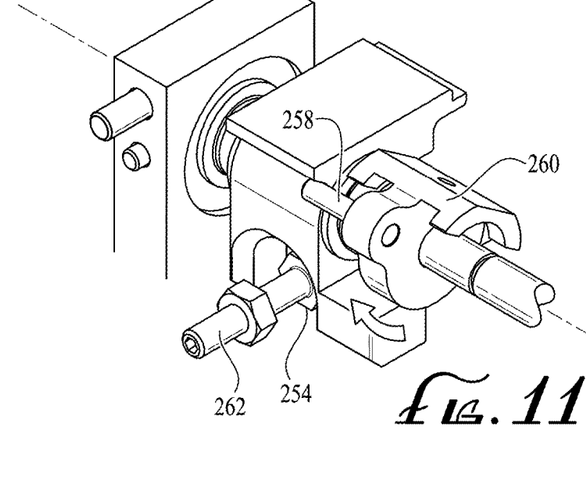

FIGS. 9-11 show a pair of hard stops 254 that limit the difference in angle between latch 240 and its corresponding shaft 242. A first hard stop 258 is a dowel installed in a spring stop 260 to act as a hard stop against spring 248 over compressing. In other words, hard stop 258 moves as shaft 242 rotates and spring 248 continues forcing latch 240 downward into a second hard stop 262, which is fixed and limits downward (clockwise) rotation of latch 240. Hard stop 262 also helps support the entire load of the tray stack to remove that burden from motor 194.

FIG. 9 shows that, when shaft 242 is turned such that hard stop 258 abuts a lower back surface of latch 240, latch 240 is in its mid position and spring 248 is less compressed. In its mid position, latch 240 is still held in its horizontal position by torsion spring 248 but can be pushed back upward into a slightly retracted position with some force. Thus, mid position allows latches to loosely flip back (retract) when trays are being elevated and overcome the spring force, and then flip down as the trays descend and as torsion springs 248 flip latch 240 into tray latch pockets 24 (FIG. 1). To fully retract latch 240, FIG. 10 shows that hard stop 258 is more fully rotated to press the lower back surface farther from hard stop 262.

FIGS. 8 and 11 show the extended position, which is used to confirm a tray is correctly positioned on latches. For instance, the extended position is used to check whether latch 240 is level. If motor 194 is unable to get rotary magnetic encoders 200 to the correct angle in the extended position, then stacker 42 recognizes that latch 240 is not actually in tray latch pocket 24 and there is a jam.

Skilled persons will appreciate that shelf 156 is rotatable using similar principles as those described with respect to latch 240. Additional details of rotation of shelf 156 are provided with reference to FIGS. 12-16 showing a sequence of views illustrating how separator 94 splits a tray stack 270.

Initially, when tray stack 270 is moving in a downward position, if latches 180 and 186 extend such that they touch the sides of the trays, the they will get ratcheted into tray latch pockets 24 by the weight of the trays. Accordingly, latches 180 and 186 are retracted when they need not touch the trays. In the case of upward movement, retraction is not strictly necessary but retracting latches 180 and 186 does reduce wear on sides of the trays.

Figure 12:
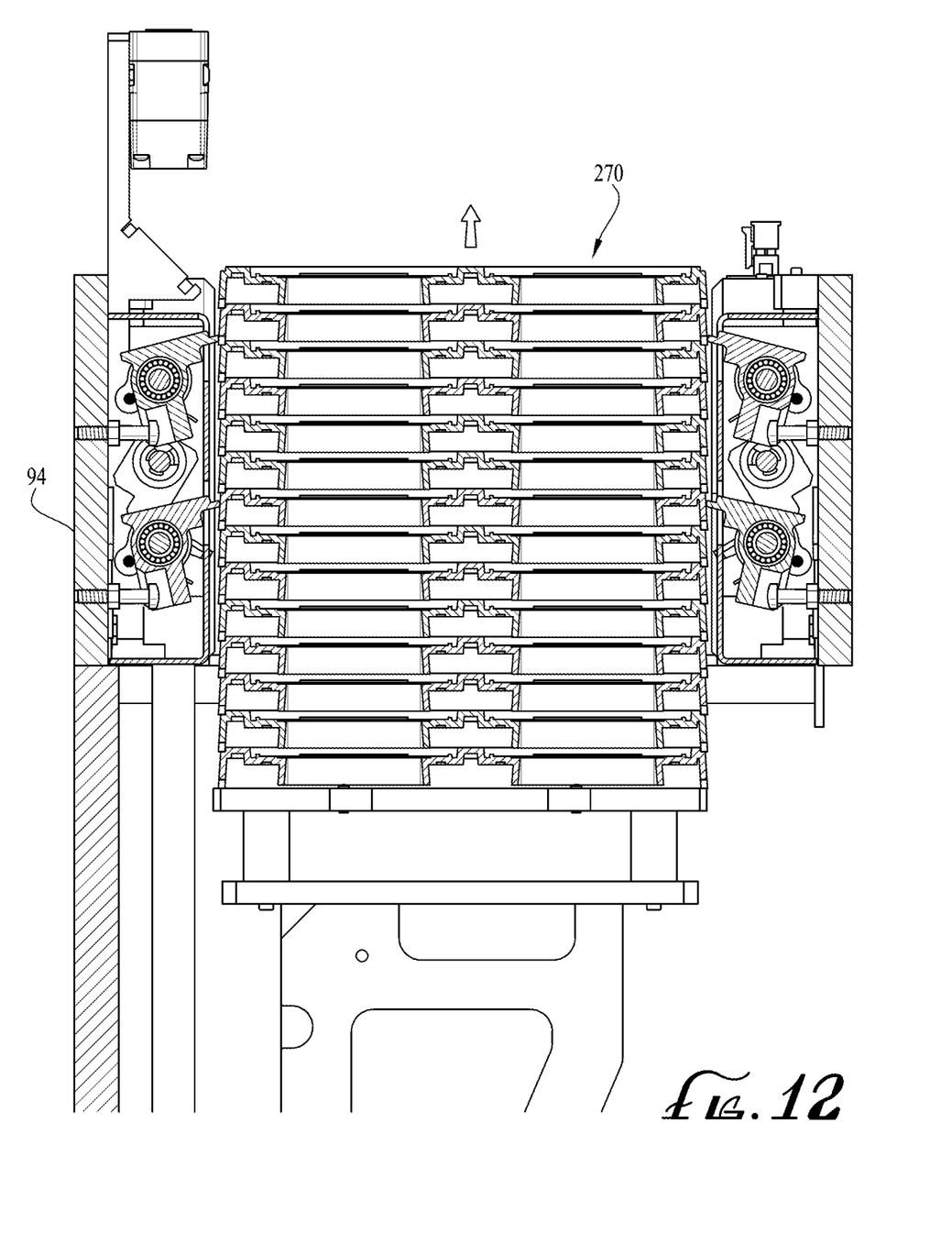
FIGS. 12, 13, 14, 15, and 16 are a sequence of front cross-section views of the separator splitting a tray stack.

FIG. 12 shows how shelf 156 is rotated down so that elevator 140 can move tray stack 270 up. As tray stack 270 moves up, latches 180 and 186 are in mid position and therefor ride against sides of trays 16 due to spring force of torsion spring 248, described previously. Thus, latches 180 and 186 form a rachet action against tray latch pockets 24.

Figure 13:
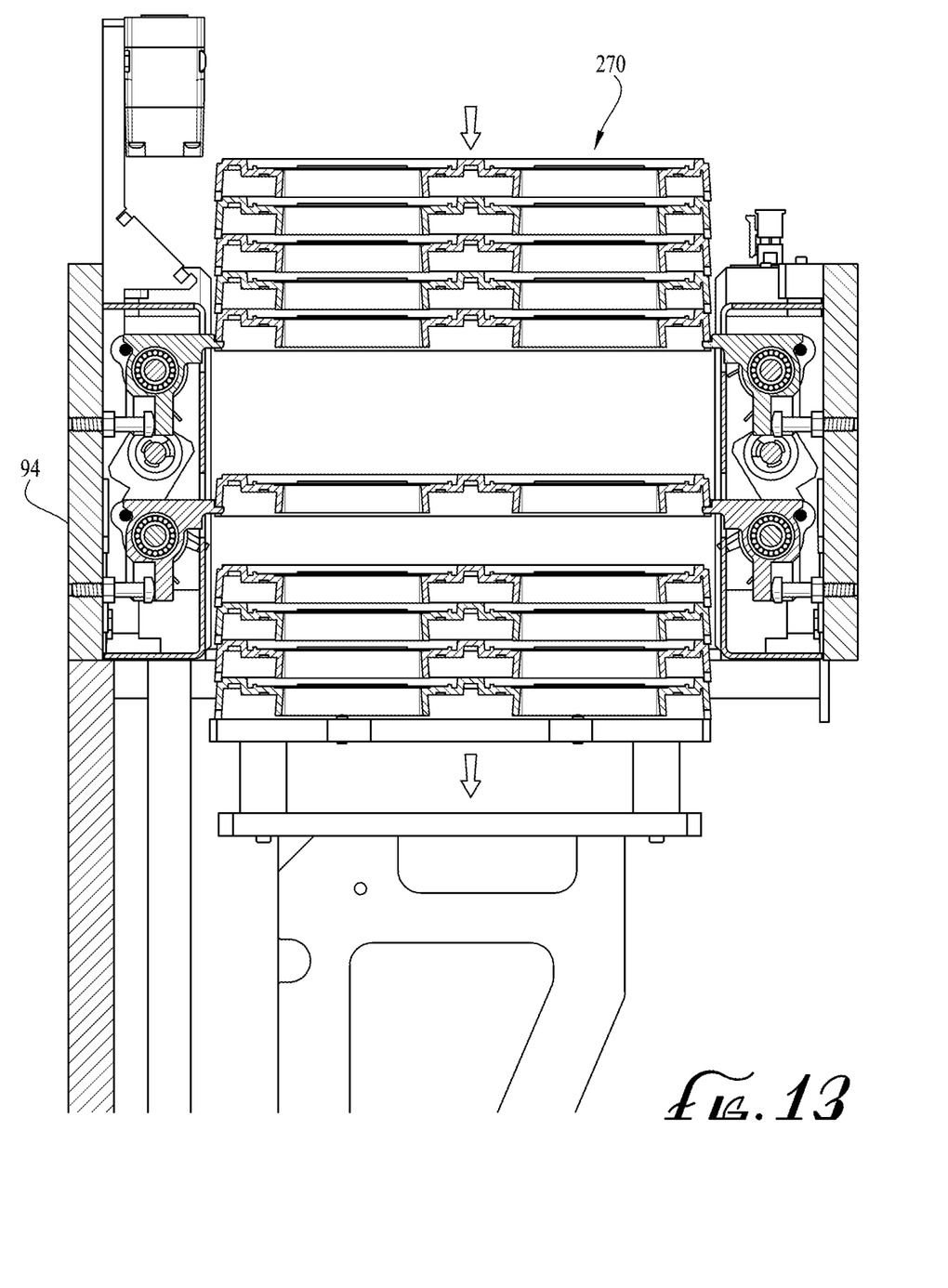

FIG. 13 shows that as elevator 140 moves tray stack 270 down, an upper portion of tray stack 270 is retained on upper latches 180 that have flipped into tray latch pockets 24 establishing an opening in tray stack 270 at a selected split position.

While lower latches 186 are fully retracted, elevator 140 continues to move a lower portion of tray stack 270 down until tray latch pockets 24 of a desired tray atop the lower portion are positioned near lower latches 186. Lower latches 186 are then placed in mid position to flip into tray latch pockets 24 of the desired tray and thereby separate it from the remaining trays on the lower portion. The remaining trays are moved farther down to create space for engaging shelf 156.

Figure 14:
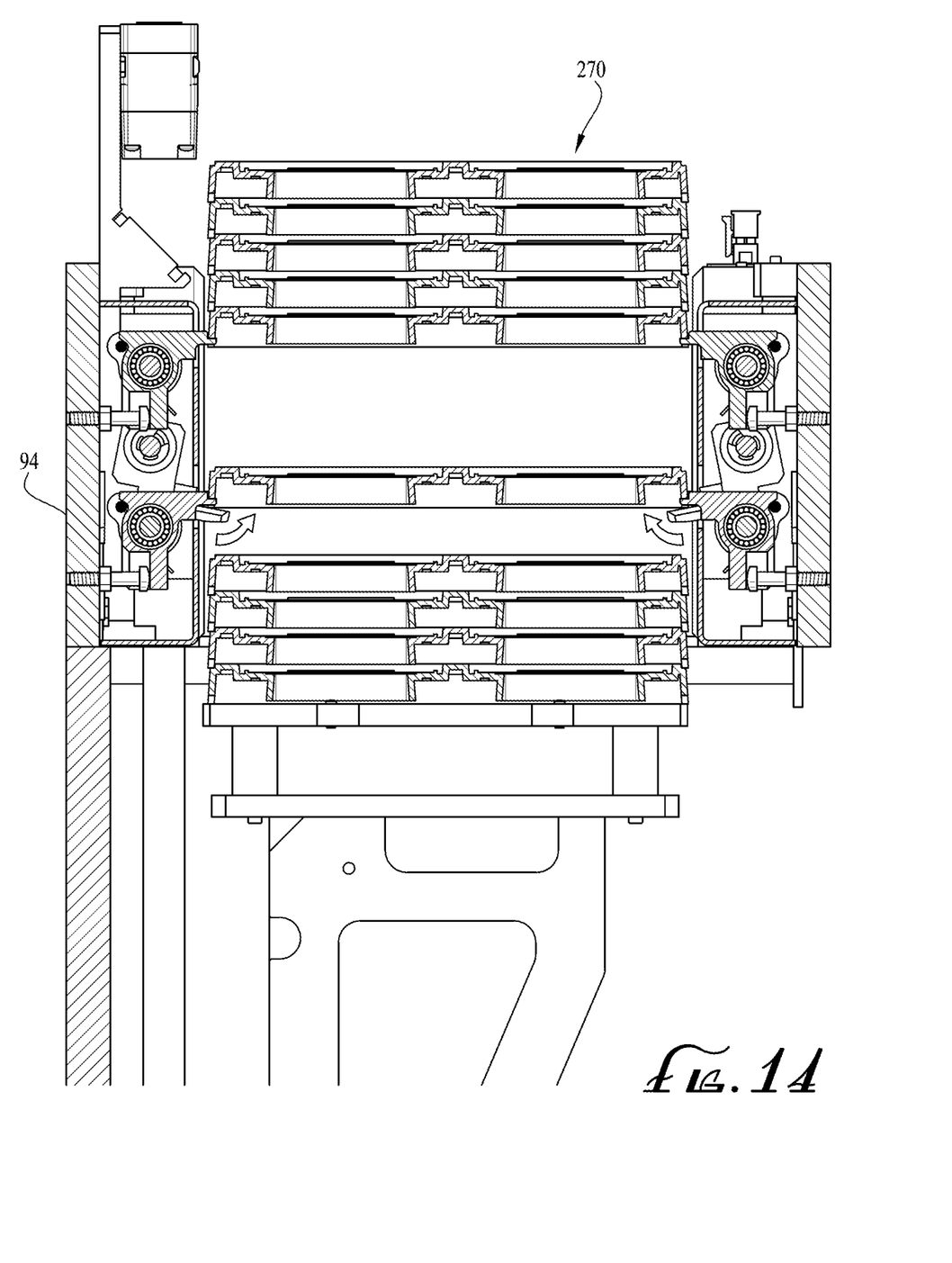

FIG. 14 shows how shelf 156 is then actuated to contact the desired tray. Thus, shelf 156 is rotated upward to contact the underside of the tray.

Figure 15:
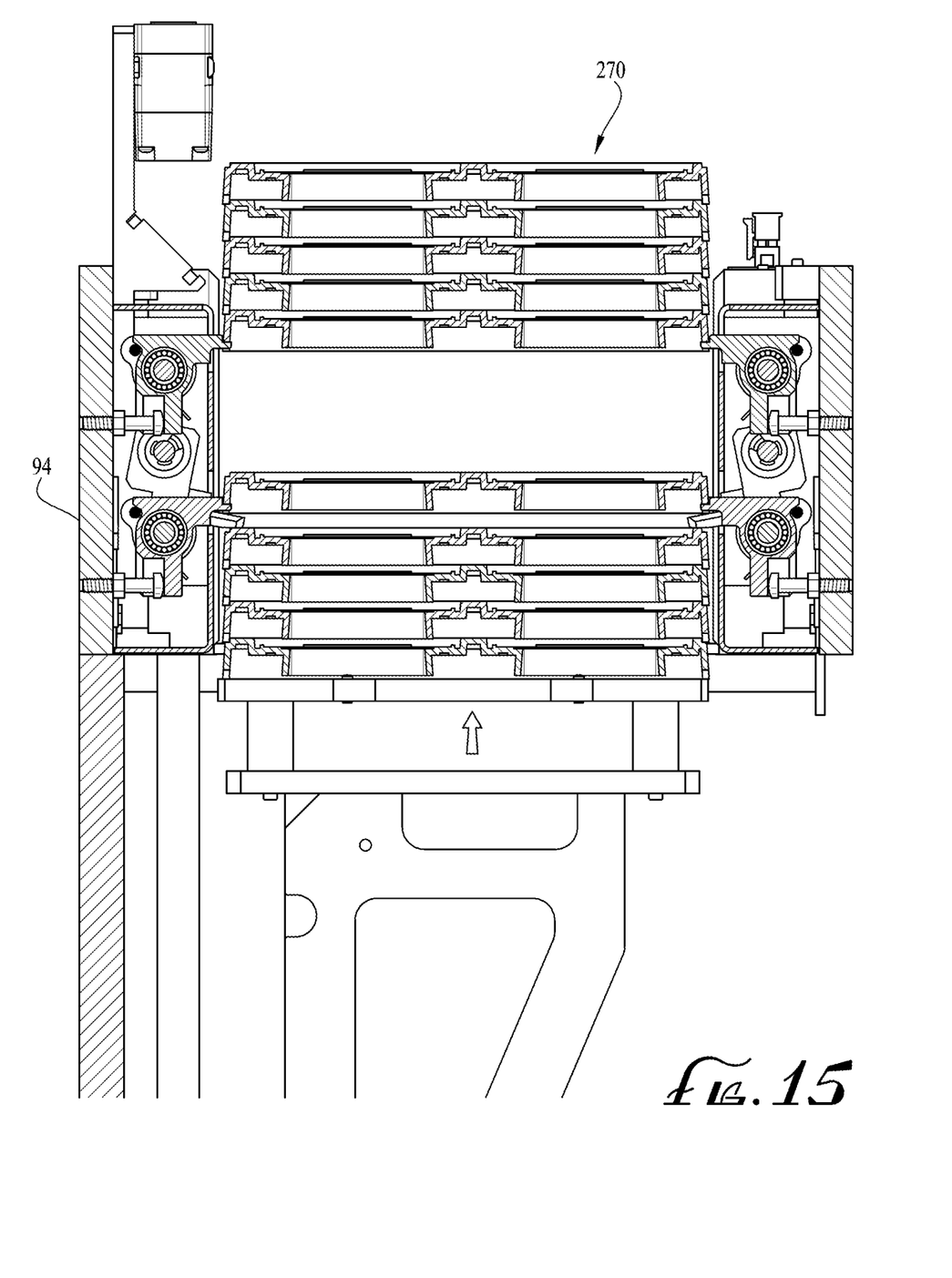
Figure 16:
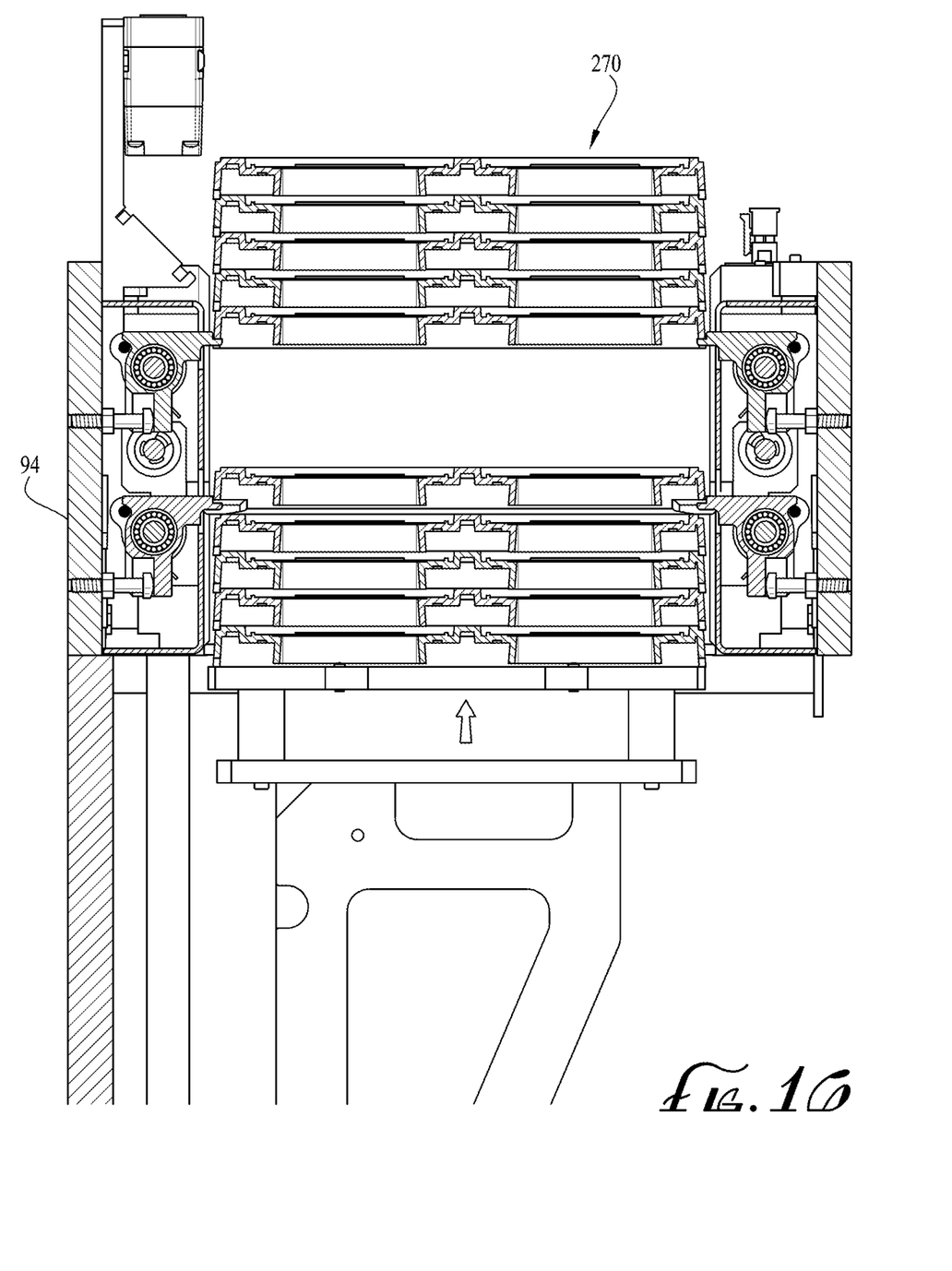

FIGS. 15 and 16 show how elevator 140 drives up to engage an underside of shelf 156, which is optional for reasons explained below. This lifts shelf 156 so that tray latch pockets 24 of the desired tray lift out of lower latches 186 so that the tray is in a load/unload position for sliding on shelf 156 and onto (or in from) unload conveyor 120. Once the desired tray is removed, shelf 156 can be retracted and tray stack 270 can be reconsolidated by moving the lower portion up toward the upper portion (i.e., allowing latches 180 and 186 to rachet and retract as tray stack 270 is lifted).

Skilled persons will appreciate that, with reference to FIGS. 15 and 16, supporting shelf 156 with trays on elevator 140 reduces the motor size and force applied to the shelf actuator and instead employs a robust elevator motor to support the tray weight and shelf 156. In other embodiments, however, elevator 140 need not support and lift shelf 156.

Steps entailed in delivering a desired stack of trays to operator 48 are like those shown and described with reference to FIGS. 12-16. Instead of engaging upper latches 180 to form an upper portion of tray stack 270, however, the selected split position is established by lower latches 186 that split a top portion on lower latches 186 from a bottom portion on elevator 140. Shelf 156 is engaged so that the top portion can then be slid out by operator 48 onto tray-stack loading station 54. Notably, shelf 156 acts to prevent operator 48 from accidentally grabbing any trays in the bottom portion.

In another embodiment, a modified shelf splits (not shown) a stack without the bottom latches or JEDEC tray latch pockets 24. In other words, lower latches 186 are optionally omitted. In this embodiment, the modified shelf essentially knifes through a lower portion of the stack to separate a desired tray in the load/unload position.

In some embodiments, a tray handler includes multiple, vertically spaced-apart tray separators on each stacker for high speed processing and filling different trays at the same time. In other embodiments, a stacker may include separators that are positioned out the front and the side, or stackers may be chained together from front to back to further expedited processing.

Skilled persons will now appreciate that many changes may be made to the details of the above-described embodiments without departing from the underlying principles of the invention. The scope of the present invention, therefore, should be determined by claims and equivalents.

The invention claimed is:

1. A tray handler for transporting a tray into or out from a selectable position within a tray stack stowed in the tray handler, the tray handler comprising:
    a multiple position conveyor system, wherein the multiple position conveyor system includes an unload station and a nest station and is configured to adjust the horizontal position of an ejected tray to first position and second position;
    wherein the unload station is the first position and includes an unload conveyor that is configured to receive a first tray and a second tray from the tray stack;
    wherein the nest station is the second position, and is positioned for loading and unloading the unload station using a nest conveyor that is configured to be mechanically isolated from the unload conveyor, the nest station is further configured to independently horizontally transport the second tray while the first tray is being sorted within the tray stack;
    a tray elevator configured to vertically transport the tray stack to the selectable position such that the ejected tray is positioned to be horizontally received from or by the unload station;
    a separator having a set of upper tray latches, a set of lower tray latches, and a tray shelf, wherein the separator is above the tray elevator and coupled to the unload station, the separator configured to vertically split the tray stack for accessing the selectable position and horizontally transporting the ejected tray into or out from the unload station;
    wherein the set of upper tray latches and the set of lower tray latches are configured to vertically split the tray stack;
    wherein the tray shelf is configured to extend from and retract toward an interior of the separator such that, in an extended position, the tray shelf slides under a bottom surface region of the ejected tray in a split portion of the tray stack; and
    a tray pusher, wherein the tray pusher is configured to move the ejected tray onto the unload conveyor when a loading door sensor senses that a loading door is closed.

2. The tray handler of claim 1, in which the separator is configured to split the tray stack comprising trays of different heights.

3. The tray handler of claim 1, further comprising a tray-stack loading station for one or both of an operator and an automated guided vehicle (AGV).

4. The tray handler of claim 3, in which the loading door is configured to be opposite the unload station, the loading door being coupled to the separator and further configured to transition from an upright closed position to a flat open position, the flat open position providing a flat loading surface on which to load the tray stack.

5. The tray handler of claim 4, in which the flat loading surface is a SEMI SB-1116 compliant load height.

6. The tray handler of claim 1, in which the the set of upper tray latches and the set of lower tray latches are extendable from and retractable toward an interior of the separator such that, in an extended position, the set of upper tray latches and the set of lower tray latches fit into tray latch pockets of the tray and supports a portion of the tray stack.

7. The tray handler of claim 1, in which the tray stack includes a cover tray to inhibit components from falling out of position.

8. The tray handler of claim 1, further comprising an optical code reader mounted at a side of the tray stack located in the tray handler.

9. A method, performed by a tray handler, of sorting an internal tray stack, the method comprising:
    splitting the internal tray stack at a first selected split position to establish upper and lower portions of the internal tray stack using a set of upper tray latches and a set of lower tray latches;
    separating a tray atop the lower portion using a tray shelf;
    ejecting onto an unload station the separated tray using a tray pusher; and
    reinserting the separated tray into the internal tray stack at an opening formed at a second selected split position using a unload conveyor.

10. The method of claim 9, further comprising repeating the sorting for preparing for an operator a sorted upper portion of the internal tray stack.

11. The method of claim 10, in which the sorted upper portion includes trays of different selected types.

12. The method of claim 9, further comprising tracking a vertical position of each tray in the internal tray stack using an in situ optical code reader.

13. The method of claim 9, further comprising transporting an ejected tray from the unload station to a nest station for processing the ejected tray during the sorting.

14. The method of claim 9, further comprising receiving at a loading station an unsorted tray stack.

15. The method of claim 9, in which at least two trays of the internal tray stack have different heights.

16. The method of claim 9, in which the internal tray stack includes JEDEC tray frames covering inserts of different heights.

* * * * *